Jan. 25, 1955

H. L. HARTMAN 2,700,309

TWO-SPEED FRICTION DRIVE TRANSMISSION
FOR PHONOGRAPH TURNTABLES

Filed Nov. 23, 1948

INVENTOR.
Herbert L. Hartman
BY Slough & Slough
His Attorneys

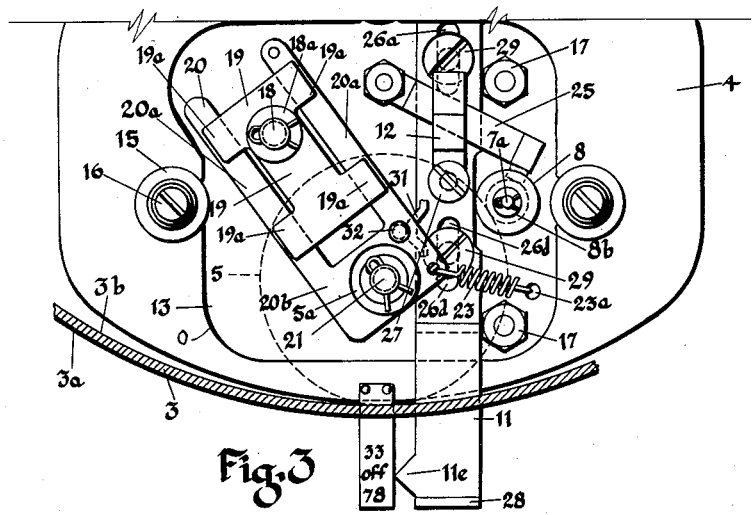
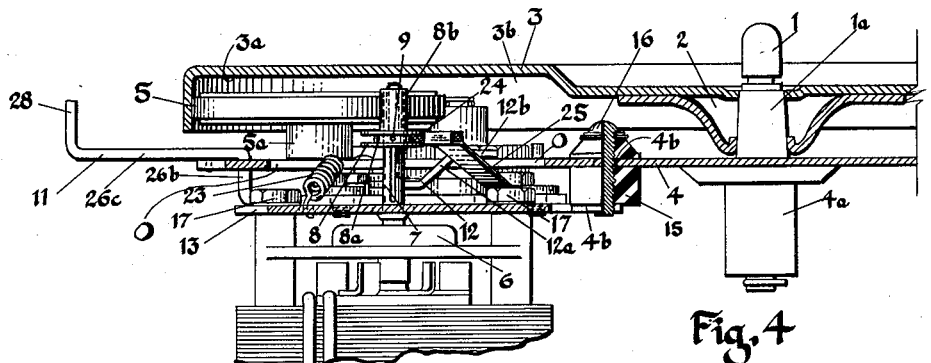
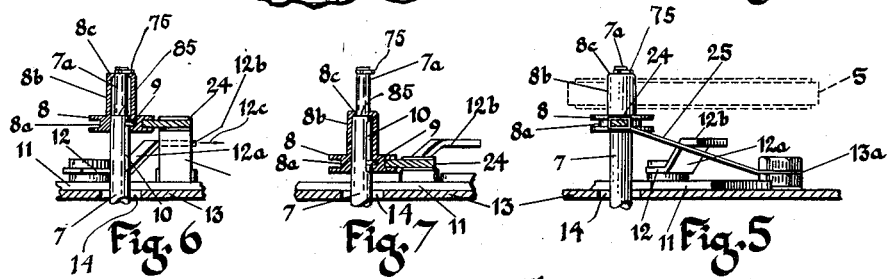
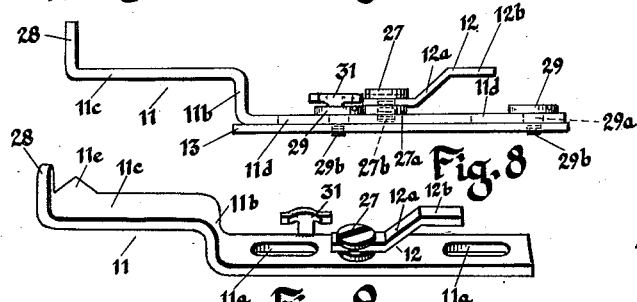

Jan. 25, 1955

H. L. HARTMAN 2,700,309

TWO-SPEED FRICTION DRIVE TRANSMISSION
FOR PHONOGRAPH TURNTABLES

Filed Nov. 23, 1948

INVENTOR.
Herbert L. Hartman
BY
Slough + Slough,
His attorneys

Jan. 25, 1955

H. L. HARTMAN 2,700,309

TWO-SPEED FRICTION DRIVE TRANSMISSION
FOR PHONOGRAPH TURNTABLES

Filed Nov. 23, 1948

INVENTOR.
Herbert L. Hartman
BY Slough & Slough
His Attorneys

United States Patent Office 2,700,309
Patented Jan. 25, 1955

2,700,309

TWO-SPEED FRICTION DRIVE TRANSMISSION FOR PHONOGRAPH TURNTABLES

Herbert L. Hartman, Elyria, Ohio, assignor to The General Industries Company, Elyria, Ohio, a corporation of Ohio Application November 23, 1948, Serial No. 61,534

6 Claims. (Cl. 74—199)

My invention relates to a friction driving mechanism for phonograph turntables and relates more particularly to such mechanism adapted to be manually pre-adjusted to drive the turntable at plural rotational speeds.

The mechanism of my present invention involves the provision of improved means for adjusting a frictional drive transmission receiving power from an electric motor to cause the shaft of said motor to drive the turntable through the instrumentality of a pendant annular flange for the turntable preferably at the periphery thereof and an idler wheel peripherally engaged with an annular surface of said flange and by providing the said motor shaft with a longitudinally slidable pulley which can be adjusted to cover the upper end of the motor shaft to cause the idler wheel and therefore the turntable to be driven at an increased rate of speed as compared to such rotational rates which are effected when the idler wheel is frictionally driven by an end portion of the shaft which is of lesser outside diameter than is the said pulley.

More particularly, my invention involves improved means to raise and lower such a pulley on said motor shaft which preferably extends vertically into the horizontal zone of the turntable flange, so that the idler wheel disposed in said zone may alternately engage said shaft portion or said pulley according to the vertical position of the pulley which is keyed to rotate with the shaft, on said shaft.

An object of my invention is to provide a simple, inexpensive means to achieve the driving of a turntable by a motor, at either of two desired rotational speeds.

Other objects of my invention and the invention itself will be well understood by those skilled in the art to which my invention appertains by reference to the following description of two different embodiments of my invention and to the drawings which illustrate the said embodiments.

Referring now first to the drawings which illustrate the first embodiment of my invention:

Fig. 3 is a view substantially of the kind shown in Fig. 2 but with the apparatus adjusted to an inoperative or "off" position;

Fig. 4 is a sectional view taken on the line 4—4 of Fig. 1, the view showing a portion of the turntable, the main supporting plate, and of the electric motor for driving the turntable;

Fig. 5 is a view of a part of the apparatus shown in the foregoing figures, the view being taken as from the dotted line 5—5 of Fig. 1, and showing a slidable friction pulley adjusted, as in Fig. 1, for driving the turntable at a relatively high speed, the view also showing a cam plate and leaf spring pulley shifter operable by the plate;

Fig. 6 is a view of the apparatus of Fig. 5, taken on the line 6—6 of Fig. 1;

Fig. 7 is a view largely in section as taken from the line 7—7 of Fig. 2, the view showing the aforesaid pulley in its lowermost and inoperative adjustment position, the parts shown being substantially the same as those in Fig. 6;

Fig. 8 is a view in side elevation of a slidable adjustment strip carrying the aforesaid cam plate, and being slidable on the apparatus-supporting supplemental plate;

Fig. 9 is a perspective view merely of the slide strip of Fig. 8 together with the cam plate carried thereby;

Figure 1:
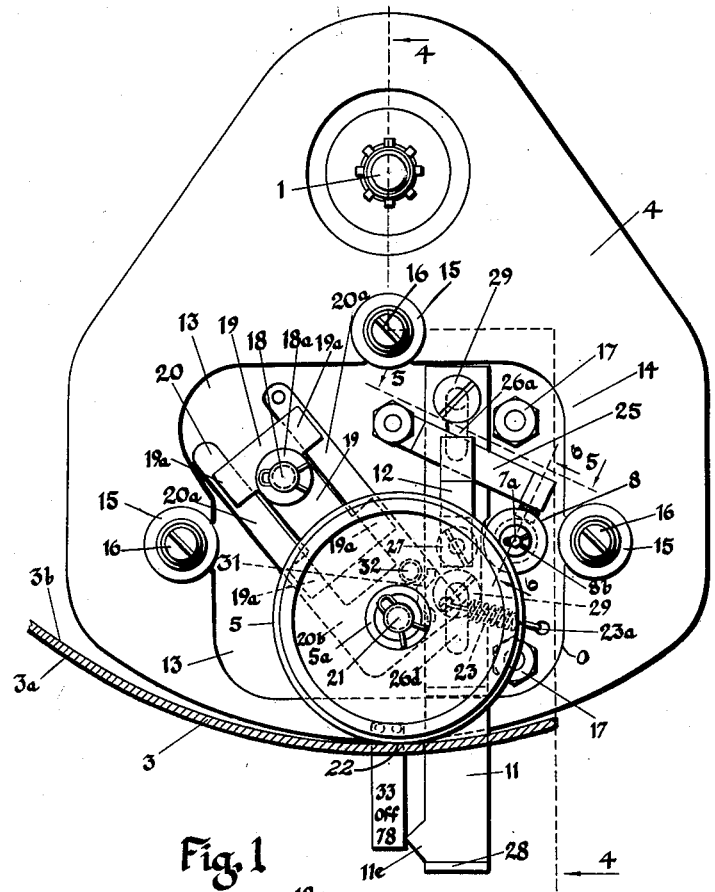
Fig. 1 shows a top plan view of the apparatus of said first embodiment, the same being adjusted to drive the pendant annular flange of a phonograph turntable shown in horizontal section at a relatively high speed.

Referring now to Figs. 1 to 9 inclusive which illustrate a first embodiment of my invention, wherein at 1 I show a turntable post having an intermediate tapered portion 1a upon which the hub portion 2 of a turntable 3, having a peripheral pendant annular flange 3a, is adapted to be removably fitted in a quite usual manner. The post 1 will be understood to be journalled within the bearing casing 4a, which is shown as pendantly supported from a mounting plate 4 which supports the entire mechanism described herein.

Figure 2:
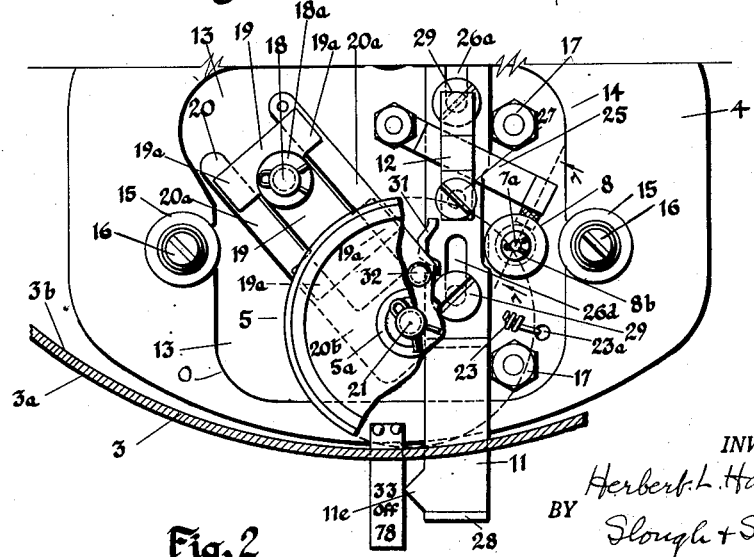
Fig. 2 is a view similar to that of Fig. 1, a portion being shown as broken away and the apparatus is shown as adjusted to effect driving of the turntable at a relatively low speed.
Figures 10, 11:
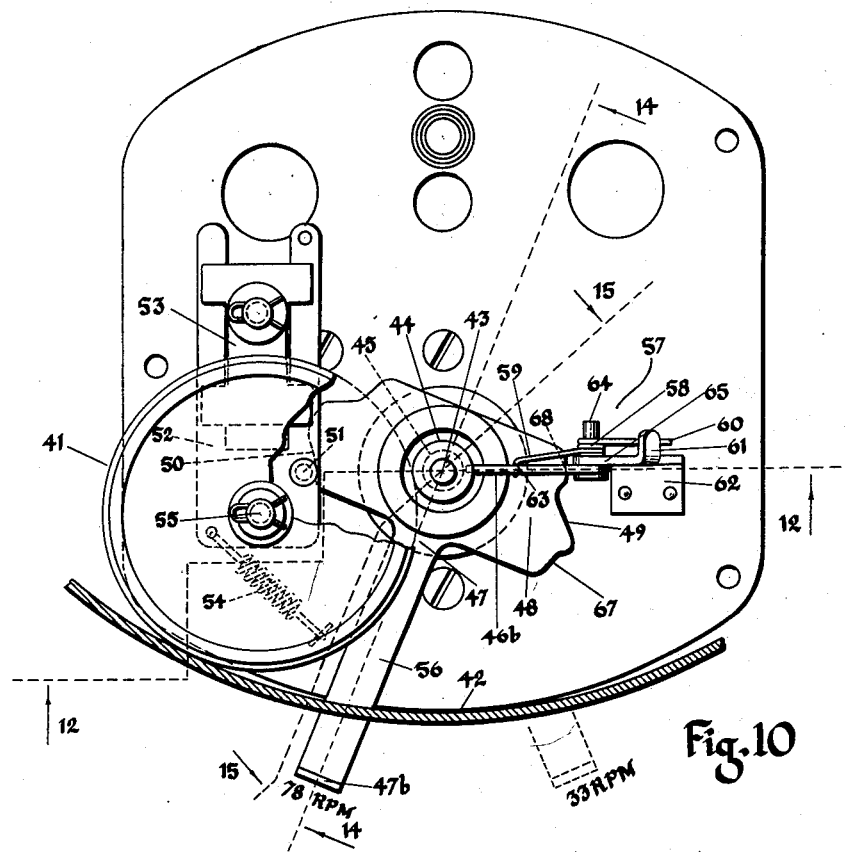
Fig. 10 is a plan view of a mechanism constituting a second embodiment of my invention, a fragment of the turntable pendant flange being shown in horizontal sectional view, the apparatus being shown in that adjustment position wherein the turntable is driven at a relatively high speed.
Fig. 11 is a view similar to that of Fig. 10 with upwardly disposed portions cut away, the view illustrating the apparatus in the relatively low speed adjustment position.
Figure 12:
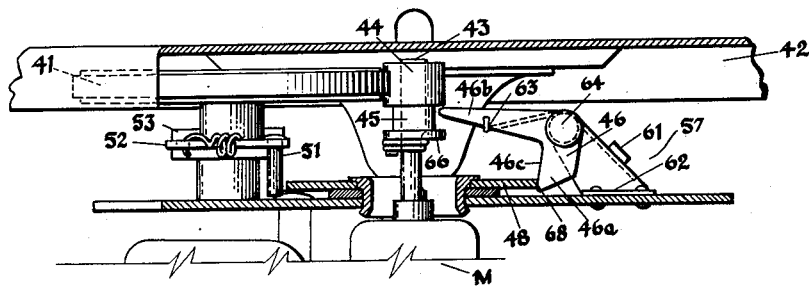
Fig. 12 is a sectional view of the apparatus of Fig. 10, portions of the showing being on the line of section 12—12 thereof.
Figure 13:
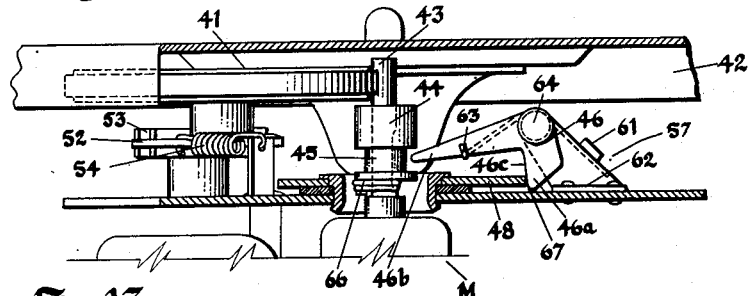
Fig. 13 is a sectional view taken on the line of section 13—13 of Fig. 11.
Figure 14:
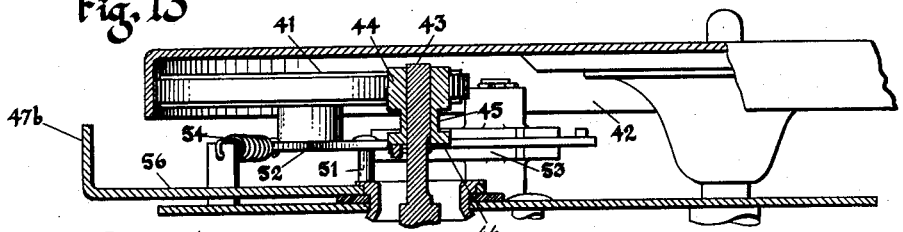
Fig. 14 is a view mostly in section taken on the line 14—14 of Fig. 10.
Figure 15:
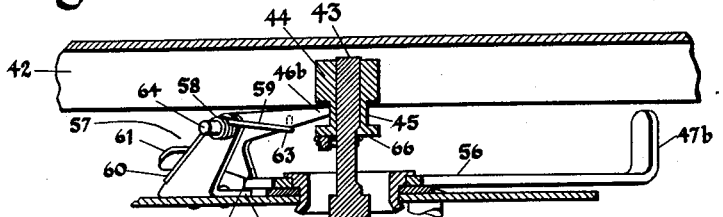
Fig. 15 is a sectional view taken on the line of section 15—15 of Fig. 10.

The pendant turntable flange 3a, best shown in vertical section in Fig. 4, has, as viewed in Figs. 1 to 3 inclusive, a surface 3b of truly annular cylindrical form which is adapted to be frictionally engaged, as in Figs. 1 to 4 inclusive, by a rubber treaded idler wheel 5. The said wheel in turn is adapted to be frictionally peripherally engaged with the upper end portion 7a of a motor shaft 7, or alternately, with a pulley 8 telescoped over and keyed to said shaft. A key pin 9 projects inwardly from the wall of the axial bore of the pulley, its inner end being fitted loosely within a vertically extending groove 10 of the motor shaft.

The motor 6, with its shaft 7 and the pulley 8 carried telescopically on said shaft end, together with the idler wheel 5, an adjustment slide plate 11, a pulley shifting spring strip 25, and other ancillary apparatus are all supported by the supplemental mounting plate 13, which is pendantly supported from interspaced portions of the main plate 4, which border its large opening O, preferably by three rubber grommets 15 and machine screws 16, each of said grommets extending axially through apertures 4b of said plate 4.

Said apertures 4b are of greater diameter than the screws passing axially therethrough, so that there is no metallic connection between the main and supplemental plates which otherwise would transmit tonal vibrations between said main and supplemental plates.

The motor 6, which is pendantly supported by bolts 17 from the supplemental plate 13, is so disposed as to project its said motor shaft 7 vertically upwardly through the opening O of the main plate 4.

A vertical post 18 extends upwardly from the supplemental plate 13, said post, as well as the idler wheel carrier 19 and the idler wheel supporting slide 20, being substantially the same as that shown in my prior patent No. 2,421,910 dated June 10, 1947; the slide 20 is substantially of U-form, the web thereof 20b carrying an upstanding idler wheel journal post 21, and the slide arms 20a extend loosely within opposite grooves of the sides of the carrier 19, said carrier being preferably of I-form in outline. The inwardly grooved lateral extensions 19a of the carrier, loosely receive the arms 20a of the slide 20. The carrier 19 is journalled by its hub 18a on the post 18, and another post 21 is carried by the slide to provide a supporting journal for the idler wheel hub 5a, which fits over the upper portion of said latter post.

The rubber tread of the idler wheel 5 is disposed in peripheral frictional engagement with the inner face 3b of the turntable flange 3a. A tensile coiled spring 23 secured to a corner of the slide web 20b and at its other end to the supplemental plate at 23a normally urges the slide and wheel in such a direction as to maintain engagement between said wheel tread and said turntable flange in a manner similar to that shown in my above identified patent.

In order to drive the idler wheel and therefor the turntable, each at two different rotational speeds, the motor shaft 7 has its diametrically reduced upper end portion 7a adapted for engagement with said idler wheel tread to drive it at a low speed, as shown in Figs. 2 and 7.

The pulley 8 comprising an upper pulley portion 8b and a lowermost diametrically enlarged peripherally grooved portion at 8a, is adapted to be vertically shifted so as to dispose its uppermost pulley portion 8b at the level of the reduced portion 7a of the shaft, as illustrated in Fig. 6. Said pulley may rotate with the said shaft 7 at all times since the two are keyed together by the pin 9 projecting inwardly through the pulley into the groove 10 of said shaft.

By slidably elevating the pulley 8 on the shaft 7, the annular outer surface of the pulley replaces the shaft portion 7a, which is of relatively reduced diameter, for driving engagement with the tread of the idler wheel 5.

Figs. 4, 5 and 6 illustrate said pulley 8 in its upwardly adjusted position wherein, as viewed in Fig. 4 and in Fig. 1, the peripheral surface 8b of the pulley 8 is laterally engaged with the rubber treaded periphery of the idler wheel, and when said pulley, which is carried by the shaft 7, is rotated therewith, it frictionally drives the turntable by reason of the concurrent engagement of said idler wheel tread to the inner surface of the turntable flange.

As viewed in Fig. 7, the pulley 8 may be lowered to permit direct engagement of the upper portion 7a of the shaft, with the idler wheel tread, the same being illustrated in plan view in Fig. 2. Up and down adjustment of the pulley is limited by engagement of the upper wall of the pulley with the retaining wire 75 and the shaft shoulder 85.

Adjustment of the pulley 8, to shift it from one to the other of its differently elevated adjustment positions, as shown in Fig. 6 is accomplished by vertical adjustment movements imparted to a felt element 24 which fits within the annular groove 8a and is carried upon the free end of a resilient metal strip 25 anchored at 13a on the supplemental plate 13, and by reference particularly to Fig. 5 it will be readily understood that when the free end of the strip 25 is depressed, the felt element 24 will move the pulley 8 from its uppermost illustrated position of Fig. 5 to its lowermost illustrated position shown in Fig. 7, so as to permit the peripheral tread of the idler wheel 5 to engage said shaft surface 7a which is of relatively less diameter.

The spring strip 25 is of such form as always to tend to elevate the felt element 24 beyond its uppermost position as illustrated in Fig. 5, so that the pulley 8 can only be lowered by exerting a downwardly directed force upon said pulley or upon said spring 25, as shown, and this is accomplished by the provision of the cam plate 12, one end of which is rigidly secured to the longitudinal reciprocal slide plate 11, by a machine screw 27 passed through an aperture of said end and through a washer 27a into the threaded aperture 27b of the slide plate.

The cam strip 12 is provided with an intermediate upwardly inclined cam portion 12a and a free end portion 12b, said free end portion being adapted for superpositioning it over an intermediate portion of the spring 25 to permit the felt-carrying end of the spring to take its uppermost position, the inclined cam portion 12a, at such time, being disposed laterally of said spring.

These relative positions are achieved when the adjustment plate 11 is in its most outwardly adjusted position as shown in Fig. 1, and as best shown in Figs. 4 and 6, wherein the pulley 8 is shown as being in its uppermost position, surrounding the reduced end 7a of the motor shaft 7, and the spring 25 is shown as maintaining said pulley in such upwardly adjusted position.

To lower the pulley 8 so that its pulley portion 8b leaves the shaft portion 7a unshrouded and free to engage the peripheral tread of the idler wheel 5, as in Fig. 7, it is only necessary for the operator to grasp the handle portion 28 of the adjustment plate 11 and thrust it inwardly so that its pointer extension 11e leaves the position indicated at 78 and passes the intermediate position marked "off" and comes to its innermost position where the pointer is at the adjustment station marked 33, see Figs. 1 to 3 inclusive.

The slide plate 11 is preferably formed in the manner best shown in Figs. 8 and 9 and comprises a lowermost horizontal main body portion, a vertically extending, intermediate portion 11b and an outermost horizontal portion 11c whose upturned end 28 is adapted to be grasped by the operator for the purpose of adjustably sliding the plate.

As best shown in Fig. 9, the adjustment plate 11 is provided with a pair of elongated apertures 11a through which, as shown in Figs. 1 to 3 inclusive and in Fig. 8, machine screws 29, having an intermediate unthreaded shank 29a and threaded ends 29b, are projected with their shanks loosely fitting within said apertures 11a, said ends being screw-threaded into the supplemental plate 13.

The screw shanks 29a being of greater diameter than the threaded ends 29b, a downwardly facing shoulder is afforded which engages the upper surface of the supplemental plate 13 and prevents the screws 29 from being threaded too tightly into the supplemental plate.

When the plate 11 is moved inwardly as previously stated to present the pointer 11e to the indicia 33, the cam strip 12 is advanced in the direction of the arrow 12c, Fig. 6, whereupon the underside of its inclined cam portion 12a cammingly engages the intermediate portion of the spring strip 25, and deflects the strip downwardly thereby lowering the felt element 24 carried thereby which element is positioned between the radial flanges of the portion 8a of the pulley element 8 and said pulley is thus forced to its lowermost position as shown in Fig. 7. The pulley portion 8b thus uncovers the reduced end portion 7a of the motor shaft, so that said relatively reduced shaft portion may become directly laterally engaged with the tread of said idler wheel 5.

In order to facilitate substitution of the pulley portion 8b for the shaft portion 7a in order to frictionally transmit rotary motion of said shaft to the idler wheel 5, the slide plate 11 is provided with a vertically extending, laterally facing cam element 31 whose bottom end is rigidly secured as by welding to the upper surface of the slide plate 11, as best shown in Figs. 2, 3, 8, and 9.

The cam element 31 cooperates with a cam follower pin 32 which is rigidly secured to the slide web 20b and is projected downwardly therefrom, and is engaged by the cam element during longitudinally reciprocable adjustment movement of said cam.

The cam 31 is so positioned on the adjustment plate that its longitudinally medial portion, which is disposed laterally outermost, engages the pin 32, only at such times when the adjustment plate 11 is disposed at, or is passing through its "off" adjustment position, and as a result, whenever the pointer 11e of the adjustment plate is even momentarily at the "off" position, the pin 32 is deflected toward the left as viewed in Fig. 3, to cause said slide 20, with its said carrier 19, to be swung in the clockwise direction.

Since the slide web 20b carries the post 21 upon which the idler wheel 5 is journalled, the idler wheel also is moved in the clockwise direction, and is at such time disengaged from the pre-engaged motor shaft portion 7a, or from the pulley surface 8b, depending upon the vertically adjusted position of said pulley.

When, during adjustment movement of the slide 11, its pointer 11e is moving from its position 33 toward the position 78 by outward adjustment movement of said adjustment plate to cause the cam portion 12a of the cam element 12 to recede from engagement with the upper surface of the spring 25, the free end of the spring 25 is permitted to resiliently restore said pulley 8 to move toward its uppermost position where it again enshrouds the shaft portion 7a.

During such adjustment movement of the cam element 12a, the cam element 31 engages the pin 32 to deflect the idler wheel to move it in a direction away from peripheral engagement with said pulley 8, whereby the upward adjustment movement of the pulley portion 8b is not impeded by engagement with the tread of said wheel 5.

The ever-tensed coil spring 23 always tends to draw the slide 20 longitudinally in the outward extended direction and also tends to swing said slide about the axis of the post 18, until the wheel 5 peripherally engages the inner surface 3b of the turntable flange, and also tends to engage one of the alternative driving elements 7a or 8b.

The indicia 33 and 78 are preferably numerically related to the rotational rate in revolutions per minute which is achieved when the apparatus is adjusted to the two alternate operative positions, with the assumption that the speed of the motor with respect to the diameters of the driving elements 7a and 8b of the motor shaft is correct so that the rotational rates of 78 R. P. M. and 33 R. P. M. are relatively in substantially closely direct proportion to the diameters of said pulley 8b and said shaft end portion 7a.

Similarly, in the second embodiment of my invention illustrated by Figs. 10 to 15 inclusive, the idler wheel 41 is adapted to be disposed in peripheral engagement with the inner surface 42 of the turntable flange and concurrently is peripherally engaged either with the outer peripheral surface of the end 43 of the motor shaft, or with the peripheral surface of a pulley 44, the latter being characterized by the provision of a downwardly disposed annular groove 45 as in the described first embodiment, and also similarly, the pulley 44 is adapted to be elevated or lowered to and from an uppermost position wherein it surrounds the upper end of the motor shaft, the raising and lowering of said pulley being accomplished by adjustment of a manually operable control means.

However, where in the first embodiment a longitudinally slidable plate is employed to perform the dual functions of raising and lowering said pulley through the instrumentality of a leaf spring pulley-shifter, and as a result of movement imparted to a cam element to cause it to cammingly engage said leaf spring, in the present embodiment a swingable bell crank lever 46 is actuated responsive to horizontal swinging movements of a manually operable control lever 47.

The said control lever consists, essentially, of a single appropriately formed piece of sheet metal rotatable about a vertical axis which is located approximately centrally of a laterally enlarged inner end portion 48 of the lever 47, the portion 48 being provided with opposite lateral edge surfaces 49 and 50, the former affording a cam surface for cammingly engaging an edge surface 46c of the short arm 46a of the bell crank lever whereby the upper arm may be raised and lowered.

The opposite edge surfaces 50 of the lever portion 48, in like manner afford camming surfaces engageable with a pin element 51 pendantly carried by the idler wheel supporting slide 52, the slide and its associated carrier mount 53 being formed and operable substantially in the same manner as the similar elements of the said first described embodiment, and also being similarly pressed by a coil spring 54 so as to cause the wheel 41 journalled at 55 on said slide to be biased to tend to move in a direction to cause it to simultaneously peripherally engage both the inner surface 42 of the said turntable flange, and one or the other of said wheel-driving elements, to wit, the pulley 44 or the shaft end 43, the latter being of least diameter.

The lever 47 is journalled on a vertical post to swing about said journal when the handle end 47b of said lever is manually swung from one extreme operative position to another.

A wire spring 57, in the manner of a safety-pin, has an intermediate coil 58 and two divergent arms 59 and 60, one of the said arms being spring pressed against a flange 61 of a sheet metal mounting plate 62, the other spring arm 59 being spring pressed by its terminal hook portion 63 against the underside edge of the lever arm 46b, the intermediate coil 58 being telescoped over a horizontal pin 64, one end of which is affixed to an upwardly extending flange 65 of said support 62, whereby said spring 57 resiliently biases the lever 46 in such a direction as to cause said short arm to tend to move inwardly and downwardly, so that the upper arm 46b tends to move upwardly.

The extreme free end of the upper bell-crank lever arm 46b projects within the annular groove 45 of said pulley 44 so that said pulley is moved up or down in accordance with the direction of movement of said arm 46b.

Having thus described my invention in two embodiments, it will be apparent to those skilled in the art to which my invention appertains, that numerous and extensive departures may be made from the embodiment herein illustrated and described without departing from the spirit of my invention.

I claim:

1. In a two-speed drive mechanism for phonograph turntables of the type having an annular pendant flange comprising the combination of said flange, an idler wheel, a laterally shiftable mount affording a vertical journal for said wheel, a motor and upstanding drive shaft thereof, said wheel adapted for lateral peripheral concurrent engagement with an upper end of the shaft and with said flange to drive said turntable at a relatively low speed, a movable adjustment member comprising a handle extending outwardly from below the turntable adapted to be manually moved from either of two adjustment positions to the other said position, a pulley which is slidable on said shaft from an uppermost to a relatively lower position, and being keyed to said shaft so as to rotate therewith, means adapted to communicate motion from said member, to said pulley to move it from either to the other of said pulley positions in response to movement of said member from either to the other of its said two adjusted positions, whereby said wheel may be alternately peripherally engaged either by said shaft or by the peripheral surface of said pulley, and an element which is movable responsive to adjustment movements of said member during an intermediate position of said adjustment movements to effect lateral shifting movement of said mount in such a direction as to cause said wheel periphery to be moved laterally outwardly from said shaft to a distance whereat said wheel periphery cannot be engaged by said pulley while moving vertically on said shaft.

2. The drive mechanism substantially as set forth in claim 1, characterized by the recited element comprising a cam movable responsive to movement of the recited member and said cam adapted to engage an element of said mount during adjustment movement of said member in at least one direction to laterally deflect said mount element and thereby move said wheel out of the path of the upwardly moving pulley.

3. The drive mechanism substantially as set forth in claim 1, characterized by said element and said mount being relatively so disposed and formed as to afford respectively cam and cam follower means relatively engaged and subsequently disengaged only during an intermediate portion of a complete adjustment movement of said member.

4. The drive mechanism substantially as set forth in claim 1, characterized by the provision of a pulley shifter means having a movable portion engaged with said pulley and another portion engageable by said adjustment member, and said adjustment member when moved in opposite directions adapted to respectively effect movement of said shifter in alternate of two opposite directions to raise or lower said pulley according to the direction of movement of said adjustment member, said shifter being in the form of a leaf spring anchored at one end and with a movable portion engageable with said pulley and said adjustment member having a portion formed to provide a cam surface engageable with a cam follower surface portion of said spring.

5. The drive mechanism for a phonograph turntable substantially as set forth in claim 1, characterized by said motion communicating means being substantially in the form of a bell crank lever pivoted on a horizontal axis, one arm thereof being engaged by and movable by said adjustment member to swing said lever in opposite directions responsive to opposite adjustment movements of said adjustment member, another arm of said lever being engageable with said pulley and being so disposed as to be moved alternately upwardly and downwardly responsive to alternate oppositely directed movements of said adjustment member to raise and lower said pulley on said motor shaft, and spring means adapted to bias said lever toward one of its two alternate adjustment positions.

6. In a two-speed frictional drive for phonograph turntables of the type having a pendant turntable flange, a motor mounted with its shaft directed upwardly to dispose an end portion within said flange, a pulley telescoped over and being longitudinally adjustably slidable on said shaft to adapt said pulley for replacement in a first upper adjustment position at the level of said flange, or alternatively, in a second lower adjustment position below the level of said flange, said pulley being so keyed to said shaft as to be fixedly rotatable therewith, an idler wheel, a laterally shiftable mount comprising a vertical supporting journal for said wheel, and a spring so biasing said mount as to cause said wheel to peripherally engage said flange and also to engage the upper end portion of said shaft or when said pulley is in its upwardly adjusted position to engage said pulley, the combination of said flange, shaft, pulley, mount, wheel, and spring, with adjustment means for alternately adjusting said pulley to its upper or lower adjustment positions, said adjustment means comprising a laterally swingable lever having a handle portion projecting outwardly beyond the periphery of said turntable and adapted to be moved in opposite directions between two operative adjustment positions, or to an inoperative position, pulley shifting means adapted to communicate movement from said lever to said pulley to cause it to be moved to either its said upper or lower adjustment position, according to the direction of swinging adjustment movement manually imparted to the lever, and an element movable by said lever and adapted to effect disengagement of said wheel periphery from the pre-engaged pulley or shaft end portion, while said lever is being moved through its said adjustment position.

References Cited in the file of this patent

UNITED STATES PATENTS

| | | |
|---|---|---|
| 2,254,066 | Gruber et al. | Aug. 26, 1941 |
| 2,438,265 | Metzner | Mar. 23, 1948 |